United States Patent
Biederstedt et al.

(10) Patent No.: US 12,439,267 B2
(45) Date of Patent: Oct. 7, 2025

(54) MICROWAVE DESIGN TOOL

(71) Applicants: AT&T Intellectual Property I, L.P., Atlanta, GA (US); Interwise Ltd., Airport City (IL); AT&T Mobility II LLC, Atlanta, GA (US)

(72) Inventors: Randal D. Biederstedt, Carmel, IN (US); Veronica Anne Gensamer, Alpharetta, GA (US); Golan Harel, Holon (IL); Matthias F. Shea, II, Bulverde, TX (US)

(73) Assignees: AT&T Intellectual Property I, L.P., Atlanta, GA (US); AT&T Mobility II LLC, Atlanta, GA (US); Interwise Ltd., Airport City (IL)

( * ) Notice: Subject to any disclaimer, the term of this patent is extended or adjusted under 35 U.S.C. 154(b) by 673 days.

(21) Appl. No.: 17/662,018

(22) Filed: May 4, 2022

(65) Prior Publication Data
US 2023/0362659 A1    Nov. 9, 2023

(51) Int. Cl.
*H04W 16/14* (2009.01)
*H04W 16/18* (2009.01)
*H04W 28/02* (2009.01)
*H04W 84/18* (2009.01)

(52) U.S. Cl.
CPC .......... *H04W 16/14* (2013.01); *H04W 16/18* (2013.01); *H04W 28/0236* (2013.01)

(58) Field of Classification Search
CPC . H04W 16/18; H04W 28/0236; H04W 84/18; H04W 16/14
See application file for complete search history.

(56) References Cited

U.S. PATENT DOCUMENTS

| | | | |
|---|---|---|---|
| 10,887,773 B2 | 1/2021 | Benson et al. | |
| 11,025,340 B2 | 6/2021 | Hashemi et al. | |
| 2019/0379553 A1* | 12/2019 | Sindhu | H04L 67/1097 |
| 2020/0351670 A1* | 11/2020 | Benson | H04B 10/27 |
| 2020/0389808 A1* | 12/2020 | Wong | H04W 28/0236 |
| 2022/0159761 A1* | 5/2022 | Ross | G06Q 20/223 |

\* cited by examiner

*Primary Examiner* — Kwang B Yao
*Assistant Examiner* — Patrick Yipao Pei

(57) ABSTRACT

Techniques for developing and/or building microwave system infrastructure are enabled. For example, a method can comprise: based on the properties of the respective ones of the group of microwave devices as populated in the representation, defining, a system comprising a processor, rules that define permissible interactions between respective ones of a group of microwave devices associated with a development of a microwave network infrastructure, based on a representation and rules, planning, by the system, respective wireless hops between the respective ones of the group of microwave devices, and assigning, by the system, respective wireless paths to respective ones of the respective wireless hops further based on the rules.

20 Claims, 10 Drawing Sheets

MICROWAVE DESIGN TOOL

TECHNICAL FIELD

The disclosed subject matter relates to wireless communication systems and, more particularly, to techniques for developing and/or building microwave system infrastructure.

BACKGROUND

Advancements in wireless communication networks have resulted in vast increases to the scope and complexity of new and existing wireless networks. In order to proactively expand communication capabilities for new or existing networks, a network provider can install a microwave infrastructure for cellular site backhaul. Such infrastructure can be built, for instance, to create or expand wireless coverage in a given area.

The above-described background relating to wireless networks is merely intended to provide a contextual overview of some current issues and is not intended to be exhaustive. Other contextual information may become further apparent upon review of the following detailed description.

DETAILED DESCRIPTION

Figure 1:
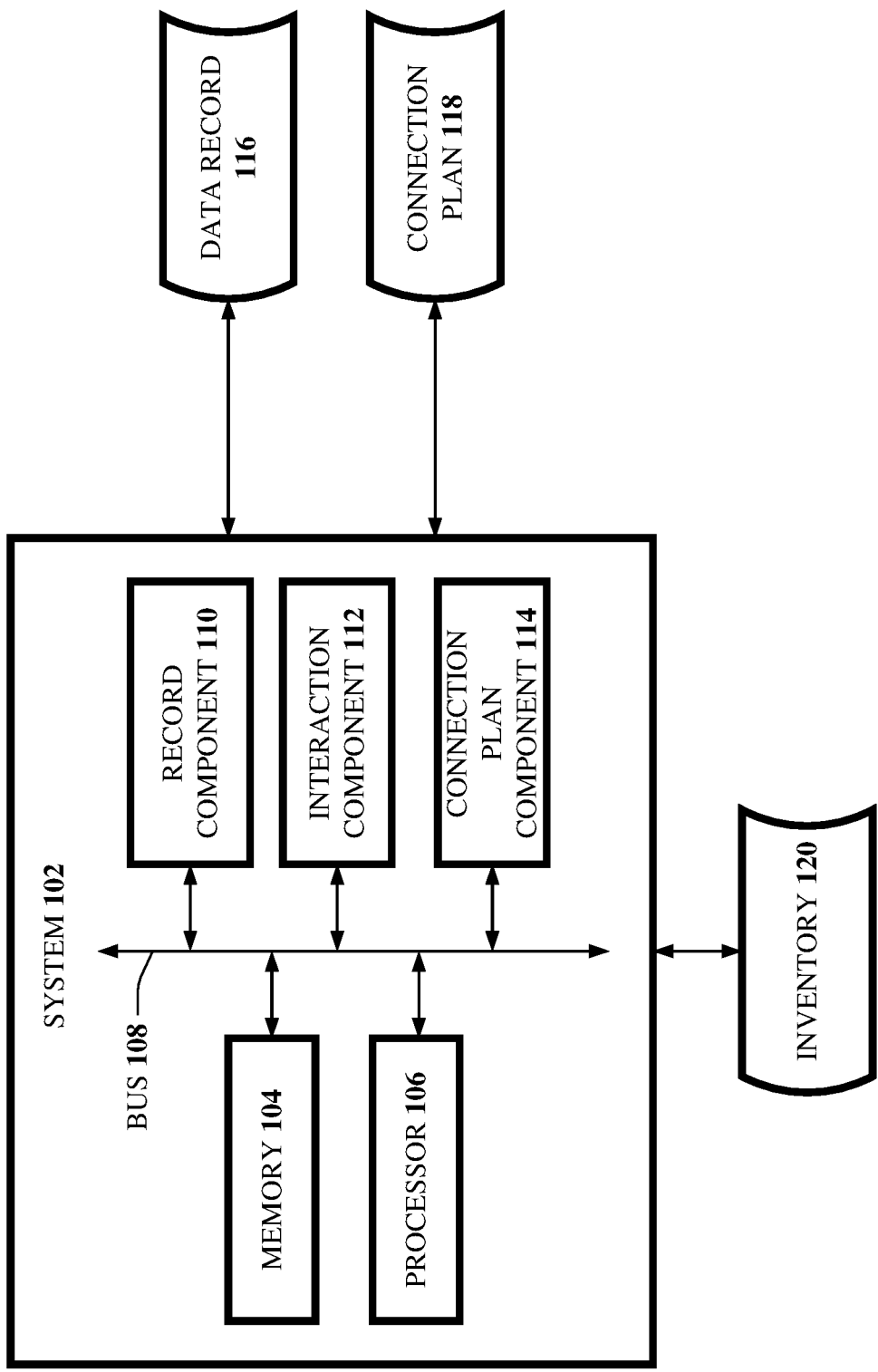
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, microwave design and/or microwave design tools can be improved in various ways, and various embodiments are described herein to this end and/or other ends.

According to an embodiment, a system can comprise a processor, and a memory that stores executable instructions that, when executed by the processor, facilitate performance of operations, comprising: generating a data record, wherein the data record identifies respective ones of a group of microwave equipment that have been assigned for a development of microwave network infrastructure to be applied to a communication network, and wherein the data record further specifies properties of the respective ones of the group of microwave equipment, based on the properties of the respective ones of the group of microwave equipment as specified by the data record, establishing a rule (e.g., one or more rules) that define permissible interactions between the respective ones of the group of microwave equipment associated with the development of the microwave network infrastructure, building a wireless connection plan associated with the communication network, wherein the wireless connection plan comprises wireless hops between respective ones of the group of microwave equipment as determined based on the data record and the rule (e.g., the one or more rules), and associating respective wireless paths with respective ones of the wireless hops of the wireless connection plan further based on the rule (e.g., the one or more rules).

In one or more embodiments, microwave equipment of the group of microwave equipment can comprise a fiber optic connection to network equipment of the communication network. In additional embodiments, a wireless hop of the wireless hops can comprise a microwave radio link aggregation.

In various embodiments, the permissible interactions can comprise usage of permissible microwave channels, and building the wireless connection plan can comprise constraining permissible wireless hops based on the permissible microwave channels. In further embodiments, the permissible interactions can be based on microwave capacity, and building the wireless connection plan can comprise constraining permissible wireless hops based on the microwave capacity. In additional embodiments, permissible interactions can be based on location, users to support, target or microwave capacity, line of sight, appropriate microwave types, bandwidth, shelf capability, In some embodiments, the above operations can further comprise: in response to generating the data record, generating a bill of materials, wherein the bill of materials comprises a listing of the respective ones of the group of microwave equipment identified by the data record.

In various implementations, the above operations can further comprise: in response to associating the respective wireless paths with the respective ones of the wireless hops, generating a machine-readable network plan, wherein the machine-readable network plan comprises the properties of the respective ones of the group of microwave equipment, the wireless connection plan, and the respective wireless paths. In further implementations, the above operations can further comprise: integrating the machine-readable network plan with a representation of a network topology for a geographical area for which network service is enabled by the communication network. In this regard, wherein the wireless hops of the wireless connection plan comprise at least one of a backhaul connection, a fronthaul connection, or a shorthaul connection.

In another embodiment, a non-transitory machine-readable medium can comprise executable instructions that, when executed by a processor, facilitate performance of operations, comprising: producing a data record, wherein the data record identifies respective ones of a group of microwave equipment that are assigned for an implementation as part of a microwave network infrastructure being implemented for a communication network, and wherein the data record further specifies properties of the respective ones of the group of microwave equipment, based on the properties of the respective ones of the group of microwave equipment as given by the data record, establishing a rule (e.g., one or more rules) that define permissible interactions between the respective ones of the group of microwave equipment associated with the microwave network infrastructure being implemented for the communication network, constructing a wireless connection plan for the communication network, wherein the wireless connection plan comprises wireless hops between respective ones of the group of microwave equipment as determined based on the data record and the rule (e.g., the one or more rules), and assigning respective wireless paths to respective ones of the wireless hops of the wireless connection plan based on the rule (e.g., the one or more rules).

In various embodiments, microwave equipment of the group of microwave equipment can comprise a fiber optic connection to the communication network. In further embodiments, a wireless hop of the wireless hops can comprise a microwave radio link aggregation.

In one or more embodiments, a permissible interaction of the permissible interactions can comprise usage of a permissible microwave channel of the permissible microwave channels, and constructing the wireless connection plan can comprise constraining a permissible wireless hop of the wireless hops based on the permissible microwave channel of the permissible microwave channels.

In some embodiments, a permissible interaction of the permissible interactions can be based on microwave capacity, and constructing the wireless connection plan can comprise constraining a permissible wireless hop of the wireless hops based on the microwave capacity.

According to yet another embodiment, a method can comprise: generating, by a system comprising a processor, a representation of respective ones of a group of microwave devices that are associated with a development of a microwave network infrastructure for usage via a communication network, populating, by the system, the representation with properties of the respective ones of the group of microwave devices, based on the properties of the respective ones of the group of microwave devices as populated in the representation, defining, by the system, rules that define permissible interactions between the respective ones of the group of microwave devices associated with the development of the microwave network infrastructure, based on the representation and the rules, planning, by the system, respective wireless hops between the respective ones of the group of microwave devices, and assigning, by the system, respective wireless paths to respective ones of the respective wireless hops further based on the rules.

In various embodiments, the above method can further comprise: in response to generating the representation, generating, by the system, a bill of materials, wherein the bill of materials comprises a listing of the respective ones of the group of microwave devices identified by the representation.

In one or more embodiments, the above method can further comprise: in response to assigning the respective wireless paths to the respective ones of the wireless hops, generating, by the system, a machine-readable network plan, wherein the machine-readable network plan comprises the properties of the respective ones of the group of microwave devices and the respective wireless paths. In this regard, in some embodiments, the above method can further comprise: integrating, by the system, the machine-readable network plan with a representation of a network topology for a geographical area to which the communication network provides network service.

In various implementations, the wireless hops can comprise at least one of a backhaul connection, or a fronthaul connection. In further implementations, a wireless hop of the wireless hops can comprise a microwave radio link aggregation.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to developing and/or building microwave system infrastructure. The system 102 can comprise one or more of a variety of components, such as memory 104, processor 106, bus 108, record component 110, interaction component 112, and/or connection plan component 114. In various embodiments, one or more of the memory 104, processor 106, bus 108, record component 110, interaction component 112, and/or connection plan component 114 can be communicatively or operably coupled (e.g., over a bus or wireless network) to one another to perform one or more functions of the system 102.

According to an embodiment, the record component 110 can generate a data record (e.g., data record 116). In various embodiments, the data record 116 can identify respective ones of a group of microwave equipment that have been assigned for a development of microwave network infrastructure to be applied, for instance, to a communication network (e.g., communication network 500 as later discussed in greater detail). In various embodiments, microwave equipment (e.g., drain 502) of the group of microwave equipment can comprise a fiber optic connection to network equipment of the communication network (e.g., for network backhaul).

It is noted that the data record 116 can further specify properties of the respective ones of the group of microwave equipment. In an aspect, the data record 116 can be configured to comprise or supplement a list of equipment, (e.g., as assigned by the connection plan component 114 to be applied to a communication network), with respective properties of the assigned equipment. In an aspect, the properties of a hardware item listed in the data record 116 can vary based on the type of hardware item. Such properties of the respective ones of the group of microwave equipment can comprise, for instance, microwave model, frequency consumed, tower or transmit antenna properties, licensing properties, azimuth data elements, latitude, longitude, shelf properties, radio properties, or any other suitable property.

In one or more embodiments, a record of respective ones of a group of microwave equipment (e.g., that have been assigned for a development of microwave network infrastructure to be applied to a communication network 500) can be stored (e.g., by the record component 110) in an inventory 120 (e.g., a data storage).

According to an embodiment, the interaction component 112 can, based on the properties of the respective ones of the group of microwave equipment as specified by the data record 116, establish one or more rules that define permissible interactions between the respective ones of the group of microwave equipment associated with the development of the microwave network infrastructure. In various embodiments, the permissible interactions can comprise usage of permissible microwave channels. In this regard, building the wireless connection plan 118 (e.g., by the connection plan component 114) can comprise constraining permissible wireless hops based on the permissible microwave channels. In further embodiments, the permissible interactions can be based on microwave capacity. In this regard, building the wireless connection plan 118 (e.g., by the connection plan component 114) can comprise constraining permissible wireless hops based on the microwave capacity. Therefore, systems herein can eliminate mistakes in network planning, such as selecting a microwave path already consumed or planned to be consumed, or overprovisioning or oversubscribing a network site, thus improving network capability and reliability.

According to an embodiment, the connection plan component 114 can build a wireless connection plan (e.g., connection plan 118) associated with the communication network (e.g., communication network 500). It is noted that the wireless connection plan 118 can comprise wireless hops between respective ones of the group of microwave equipment (e.g., as determined based on the data record 116) and the one or more rules. In one or more embodiments, the connection plan component 114 can associate respective wireless paths with respective ones of the wireless hops of the wireless connection plan 118 further based on the one or more rules. In various embodiments, a wireless hop of the wireless hops can comprise a microwave radio link aggregation (RLAG).

Various systems and techniques described herein can facilitate the design and implementation of microwave network infrastructure that is built prior to the implementation of the infrastructure into a communication network (e.g., communication network 500). To accommodate capacity requirements associated with fifth generation (5G), sixth generation (6G), and other networks, and to provide for future scaling while reducing costs associated with fiber deployment, a wireless radio access network can employ microwave communications between cellular towers for implementing and/or expanding a wireless network. In view of the new design strategies for wireless networks being developed, techniques for designing and planning microwave networks that support those strategies are desirable. As an example, in addition to a backhaul link, modern wireless networks can also include additional links such as shorthaul and fronthaul.

In an aspect, various techniques herein can facilitate the design and implementation of microwave networks in an all-encompassing tool that incorporates backhaul, shorthaul, and fronthaul. Techniques described herein can facilitate designing and/or planning of a hardware layout, bill of materials, fiber circuit definitions, hops, waves (e.g., connection plans), paths, etc. using a fully encompassing tool. Further, the tool can integrate into further network management systems to allow for the design to be built, documented, and/or managed.

In an aspect, an infrastructure as designed by system 100 can be based on existing microwave installations. For instance, a microwave network as planned by system 100 can include new hardware elements that are implemented to work with previously hardware elements at a network site (e.g., for a communication network 500). Alternatively, a tool (e.g., as implemented via system 100) can serve as a basis for installation of new microwave as well as a network infrastructure (e.g., for a communication network 500). For instance, system 100 can be used to develop new network infrastructure based on an agreement between a network provider and a customer to build out network coverage for a market and/or a geographic area (e.g., a shopping mall, a sports stadium, a convention center, etc.).

Figure 2:
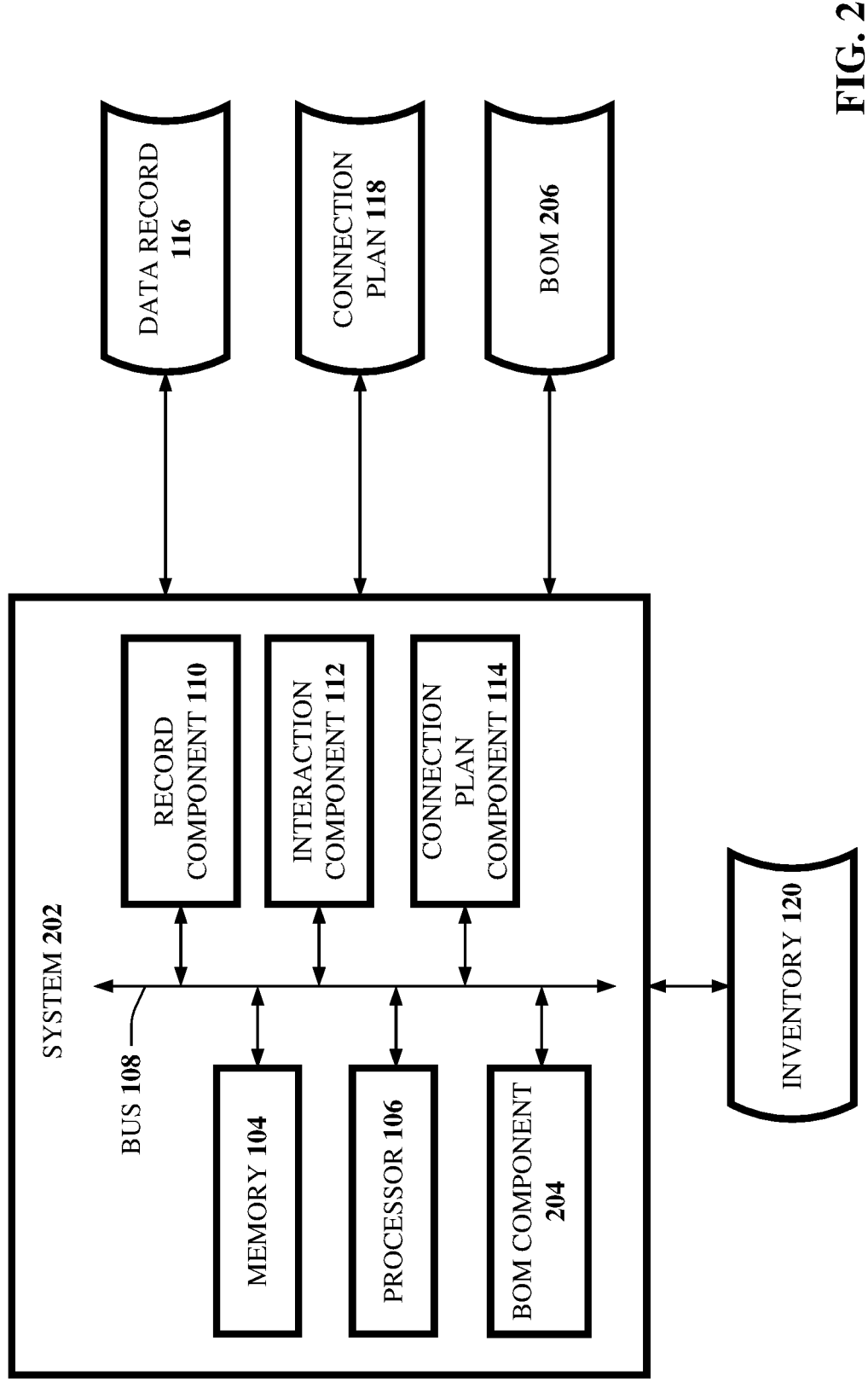
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to developing and/or building microwave system infrastructure. The system 202 can be similar to system 102, and can comprise one or more of a variety of components, such as memory 104, processor 106, bus 108, record component 110, interaction component 112, and/or connection plan component 114. The system 202 can additionally comprise a bill of materials (BOM) component 204. In various embodiments, one or more of the memory 104, processor 106, bus 108, record component 110, interaction component 112, connection plan component 114, and/or BOM component 204 can be communicatively or operably coupled (e.g., over a bus or wireless network) to one another to perform one or more functions of the system 202.

According to an embodiment, the BOM component 204 can, in response to the generation of the data record by the record component 110, generate a bill of materials (e.g., BOM 206). In this regard, the BOM 206 can comprise a listing of the respective ones of the group of microwave equipment identified by the data record 116. Once created, the BOM 206 can be provided to vendors and/or other entities to request quotes for equipment listed in the BOM 206 and/or to place orders for said equipment in order to facilitate building the planned network (e.g., when new equipment is required).

Figure 3:
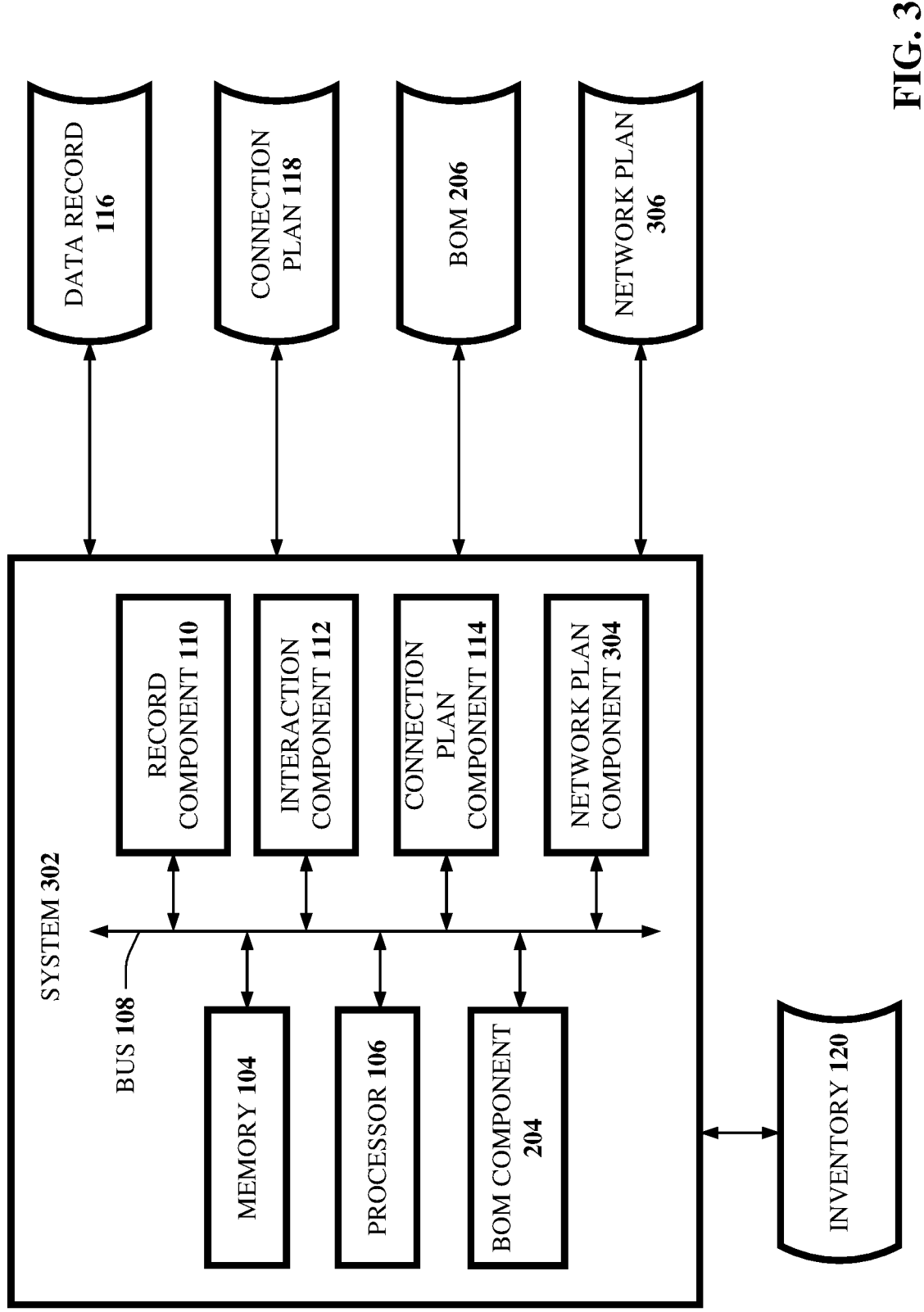
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to developing and/or building microwave system infrastructure. The system 302 can be similar to system 202, and can comprise one or more of a variety of components, such as memory 104, processor 106, bus 108, record component 110, interaction component 112, connection plan component 114, and/or BOM component 204. The system 302 can additionally comprise a network plan component 304. In various embodiments, one or more of the memory 104, processor 106, bus 108, record component 110, interaction component 112, connection plan component 114, BOM component 204, and/or network plan component 304 can be communicatively or operably coupled (e.g., over a bus or wireless network) to one another to perform one or more functions of the system 302.

According to an embodiment, the network plan component 304 can, in response to the connection plan component 114 associating the respective wireless paths with the respective ones of the wireless hops, generate a machine-readable network plan (e.g., network plan 306). In this regard, the network plan 306 can comprise the properties of the respective ones of the group of microwave equipment, the wireless connection plan, and the respective wireless paths.

In various embodiments, upon generation of the network plan 306 (e.g., containing the hardware design for the network), the BOM component 204 can utilize the network plan 306 to establish a BOM 206 corresponding to the network plan 306. Therefore, in an aspect, the BOM 206 can include a listing of respective hardware elements of the group of hardware elements as established in the network plan 306 and/or data record 116. Once created, the BOM 206 can be provided to vendors and/or other entities to request quotes for equipment listed in the BOM 206 and/or to place orders for said equipment in order to facilitate building the planned network (e.g., when new equipment is required). It is noted that, in one or more embodiments, the wireless hops of the wireless connection plan can comprise at least one of a backhaul connection, a fronthaul connection, or a short-haul connection. Additionally, respective hardware components provided in the network plan 306 can be packaged with unique labeling in order to allow downstream systems to more efficiently utilize the data contained in the network plan 306 and/or data record 116. Further the hardware components and their properties can follow a design hierarchy that can enable the respective components to build upon one another.

Figure 4:
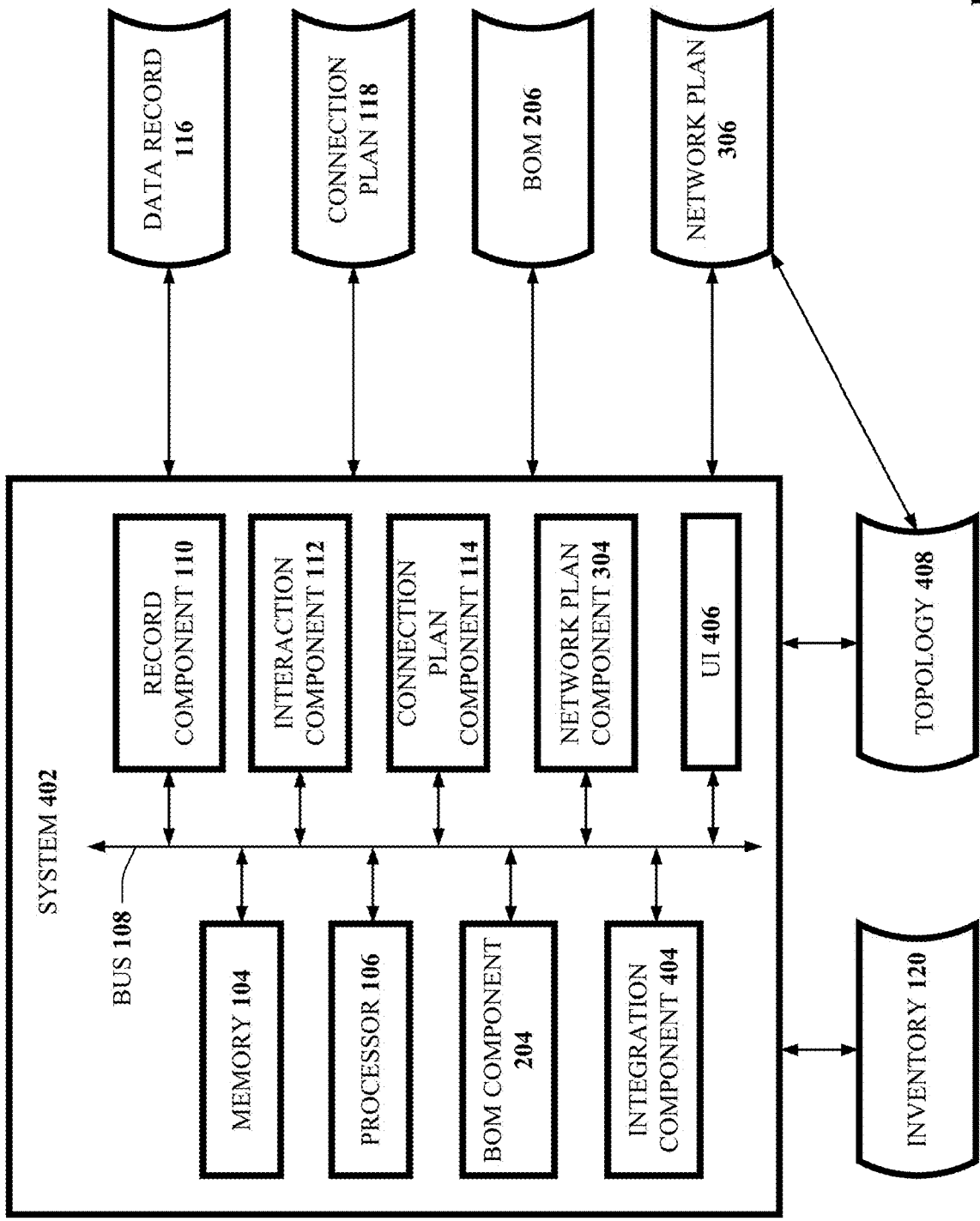
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to developing and/or building microwave system infrastructure. The system 402 can be similar to system 302, and can comprise one or more of a variety of components, such as memory 104, processor 106, bus 108, record component 110, interaction component 112, connection plan component 114, BOM component 204, and/or network plan component 304. The system 402 can additionally comprise an integration component 404 and/or user interface (UI) 406. In various embodiments, one or more of the memory 104, processor 106, bus 108, record component 110, interaction component 112, connection plan component 114, BOM component 204, network plan component 304, integration component 404, and/or UI component 406 can be communicatively or operably coupled (e.g., over a bus or wireless network) to one another to perform one or more functions of the system 402.

According to an embodiment, the integration component 404 can integrate the machine-readable network plan with a representation of a network topology 408 for a geographical area for which network service is enabled by the communication network 500. For instance, the network plan 306 can be an Extensible Markup Language (XML) representation of the network as designed by system 400, which can be sent to one or more downstream systems to facilitate building out the network as designed. Additionally, system 400 can output (e.g., via the record component 110, interaction component 112, connection plan component 114, BOM component 204, network plan component 304, integration component 404, UI component 406, or another suitable component) one or more reports that contain information relating to the network plan 306 and/or its respective component parts, which can facilitate user understanding of the planned network as well as portions of the network where future expansions could be made. Other outputs are also possible.

According to an embodiment, the UI component 406 can comprise a user interface that can receive user specifications corresponding to a microwave network and guide the operation of the record component 110, interaction component 112, connection plan component 114, BOM component 204, network plan component 304, integration component 404, or another suitable component. In an aspect, the user interface can be provided as part of a software tool and/or other program that enables a user to provide network details to respective components. In an aspect, the user interface can contain one or more forms, menus, or the like, to guide a user in creating a desired network plan 306. Additionally, the interaction component 112 can utilize one or more mechanisms to improve user accuracy with respect to the user interface, for instance, by placing rules into the design to guide the user along the design to alleviate errors, placing flags throughout the design to remove the possibility of a user deleting designs that are in service, and/or performing other similar functions. In another aspect, the user interface (e.g., via the UI component 406) can also provide statistics, reports, and/or other information to the user to assist in building a design, determining where further network growth is needed, etc.

Figure 5:
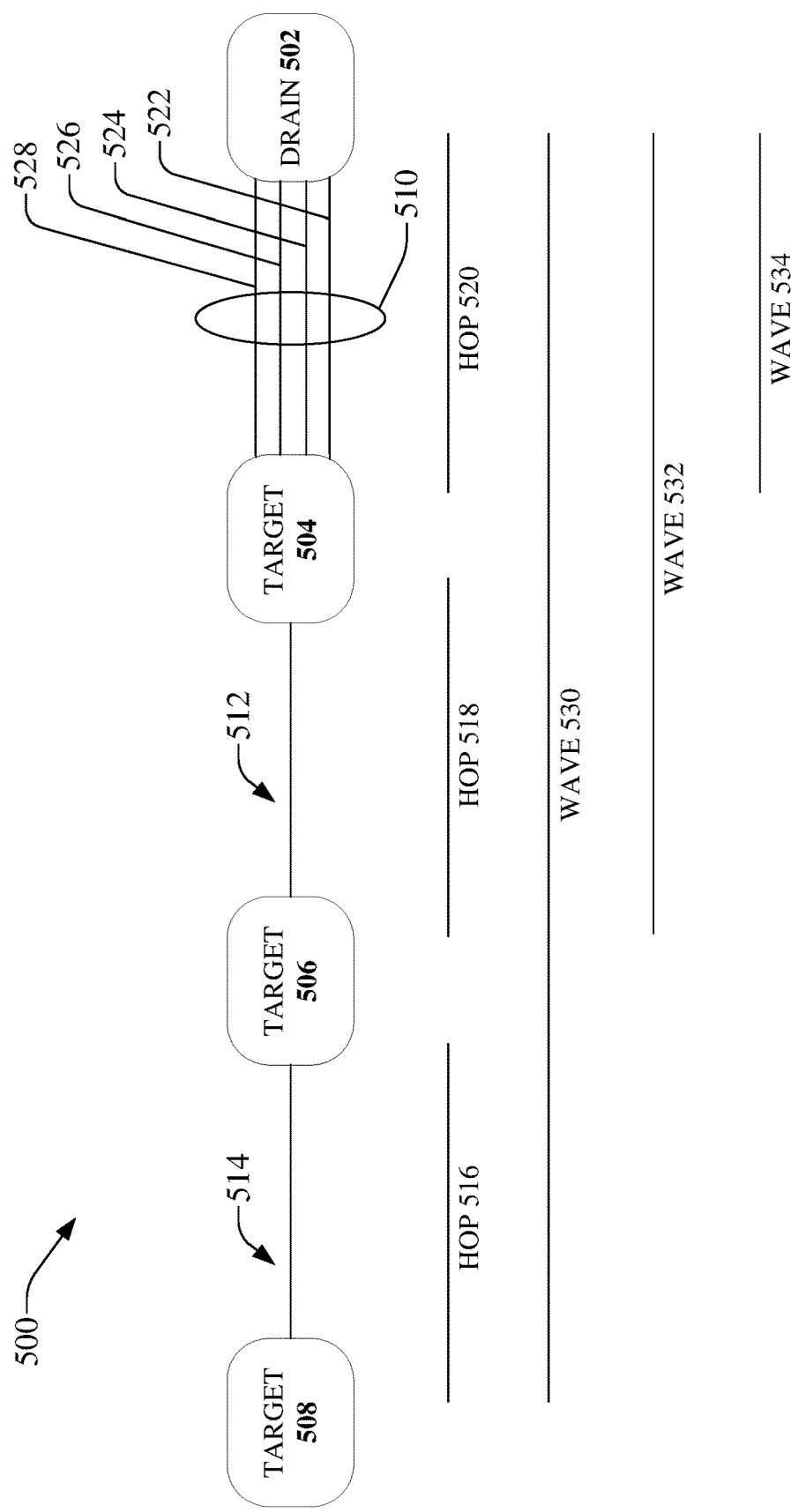
FIG. 5 is a block diagram of an exemplary wireless communication network in accordance with one or more embodiments described herein.

FIG. 5 illustrates a block diagram of an exemplary microwave design (e.g., for a communication network 500) in accordance with one or more embodiments described herein. Communication network 500 can comprise a microwave communication network, and can comprise, for instance, one or more of a drain 502, target 504, target 506, target 508, path 510 (e.g., a radio link aggregation (RLAG)), path 512, path 514, hop 516, hop 518, hop 520, wave 530, wave 532, and/or wave 534. It is noted that path 510 (e.g., an RLAG) can comprise path 522, path 524, path 526, and/or path 528.

According to an embodiment, the drain 502 can comprise a fiber-based connection (or another suitable wired or wireless connection) to an overall network (e.g., network backhaul for the communication network 500). Each target (e.g., target 504, target 506, target 508) and/or drain 502 can comprise a cell cite, which can facilitate a radio access network (e.g., a cellular network). Each hop herein (e.g., hop 516, hop 518, hop 520) can comprise a unique identifier for a jump from one target (or drain) to another target (or drain). A wave herein (e.g., wave 530, wave 532, wave 534) can comprise a connection plan (e.g., connection plan 118) of a collection of paths (e.g., path 510, path 512, path 514, path 522, path 524, path 526, and/or path 528) from a particular target to a particular drain.

In an embodiment, communication network 500 can comprise a multi-hop communication network, in which data from target 508 can be transmitted over path 514 to target 506, and then from target 506 over path 512 to target 504, and then from target 504 over path 510 to drain 502. The foregoing can comprise wave 530. Similarly, data from target 506 can be transmitted over path 512 to target 504, and then from target 504 over path 510 to drain 502. The foregoing can comprise wave 532. Likewise, data from target 504 can be transmitted over path 510 to drain 502. The foregoing can comprise wave 534. Each path (e.g., path 512 or path 514) can comprise a single channel microwave, or in the case of an RLAG (e.g., path 510), a multi-channel microwave connection. Each hop can define the total microwave activity between targets. It is noted that each wave (e.g., connection plan) can comprise the corresponding microwaves (e.g., microwave channels), paths, and hops associated with that particular wave (e.g., connection plan).

Figure 6:
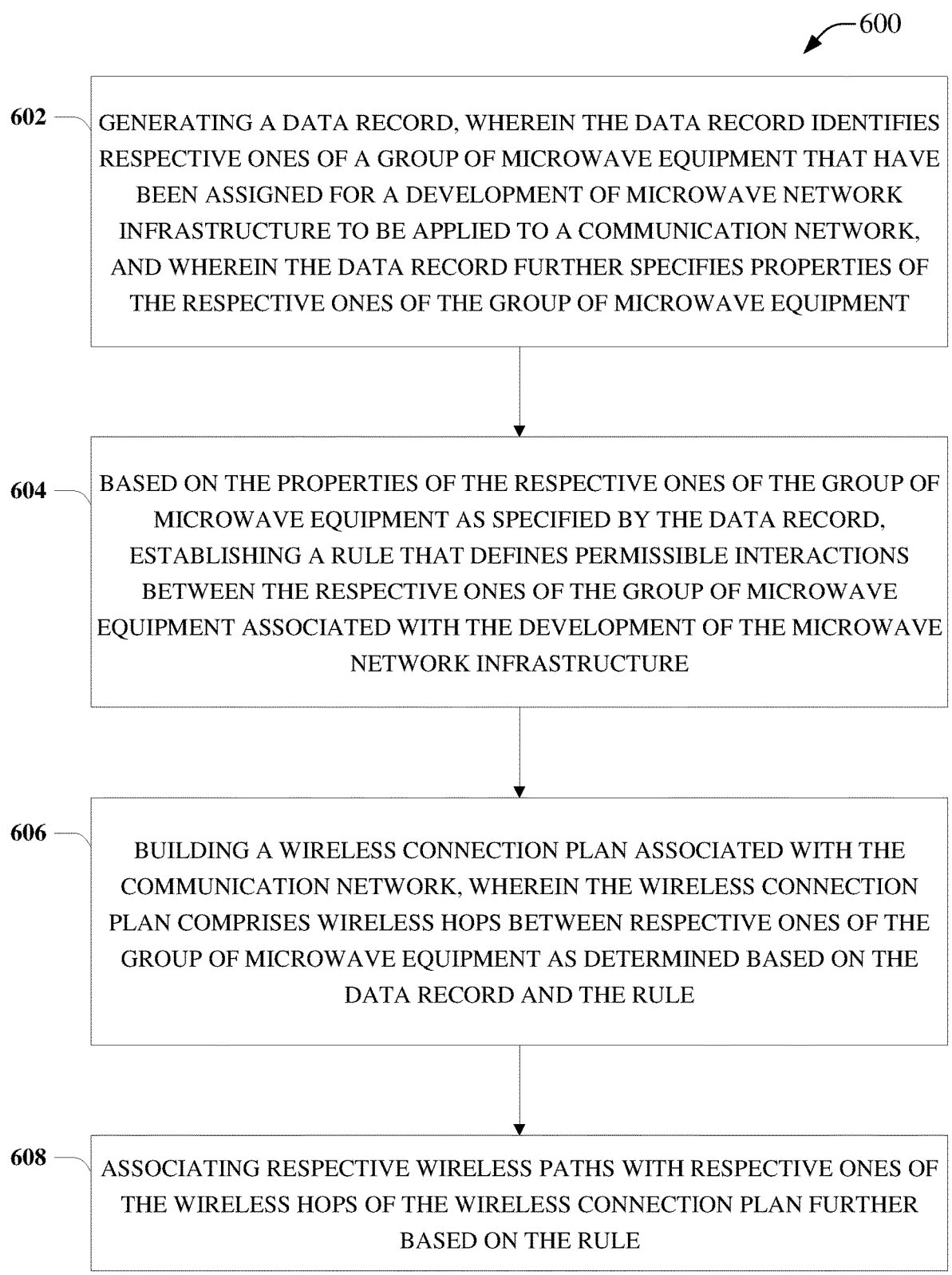
FIG. 6 is a block flow diagram for a process associated with microwave design in accordance with one or more embodiments described herein.

FIG. 6 illustrates a block flow diagram for a process 600 associated with microwave design in accordance with one or more embodiments described herein. At 602, the process 600 can comprise generating (e.g., via the record component 110) a data record (e.g., data record 116), wherein the data record (e.g., data record 116) identifies respective ones of a group of microwave equipment that have been assigned for a development of microwave network infrastructure to be applied to a communication network (e.g., communication network 500), and wherein the data record (e.g., data record 116) further specifies properties of the respective ones of the group of microwave equipment. At 604, the process 600 can comprise, based on the properties of the respective ones of the group of microwave equipment as specified by the data record, establishing (e.g., via the interaction component 112) a rule that defines permissible interactions between the respective ones of the group of microwave equipment associated with the development of the microwave network infrastructure. At 606, the process 600 can comprise building (e.g., via the connection plan component 114) a wireless connection plan (e.g., wireless connection plan 118) associated with the communication network, wherein the wireless connection plan (e.g., wireless connection plan 118) comprises wireless hops between respective ones of the group of microwave equipment as determined based on the data record (e.g., data record 116) and the rule. At 608, the process 600 can comprise associating (e.g., via the connection plan component 114) respective wireless paths with respective ones of the wireless hops of the wireless connection plan (e.g., wireless connection plan 118) further based on the rule.

Figure 7:
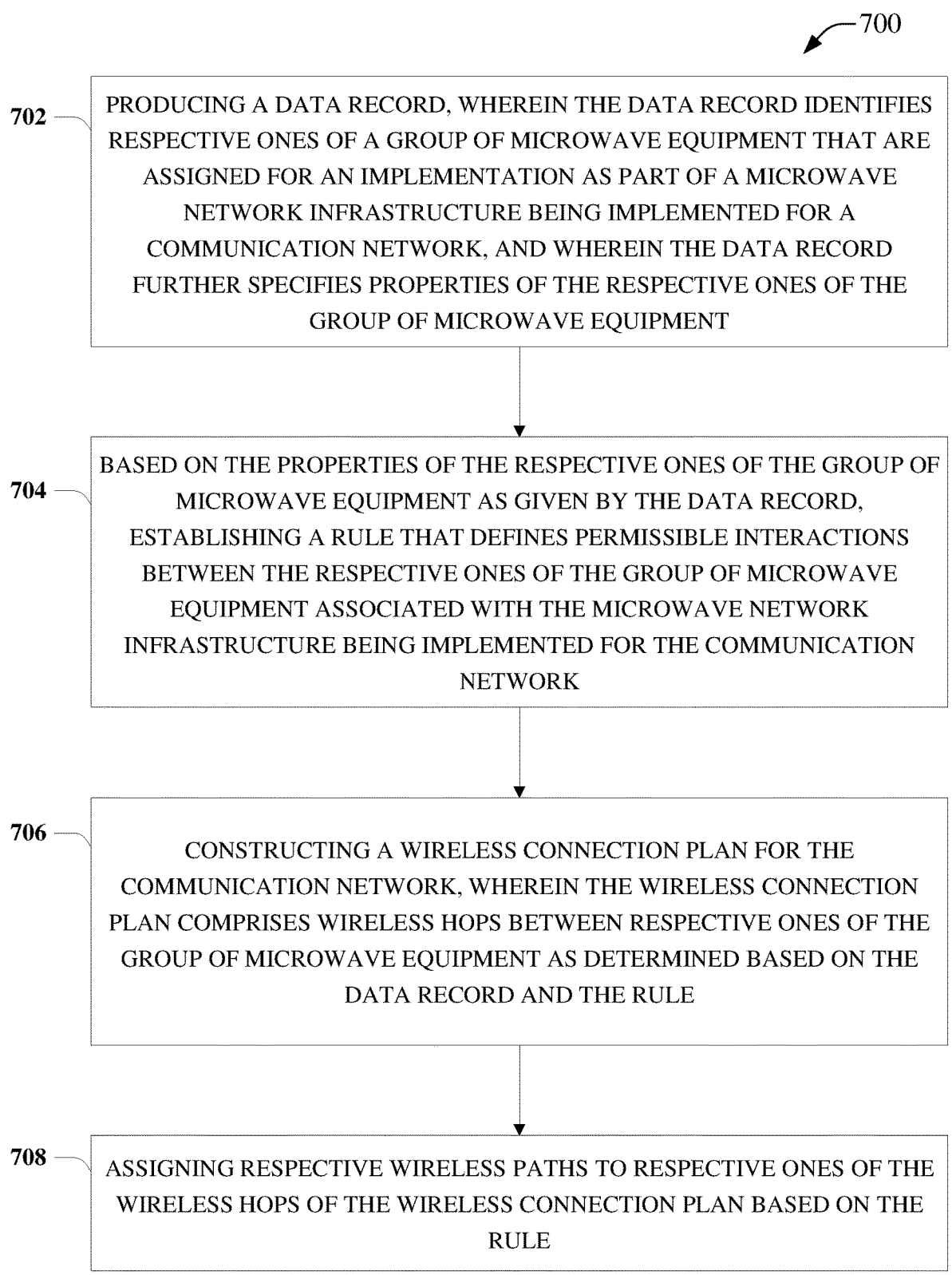
FIG. 7 is a block flow diagram for a process associated with microwave design in accordance with one or more embodiments described herein.

FIG. 7 illustrates a block flow diagram for a process 700 associated with microwave design in accordance with one or more embodiments described herein. At 702, the process 700 can comprise producing (e.g., via the record component 110) a data record (e.g., data record 116), wherein the data record (e.g., data record 116) identifies respective ones of a group of microwave equipment that are assigned for an implementation as part of a microwave network infrastructure being implemented for a communication network (e.g., communication network 500), and wherein the data record (e.g., data record 116) further specifies properties of the respective ones of the group of microwave equipment. At 704, the process 700 can comprise, based on the properties of the respective ones of the group of microwave equipment as given by the data record, establishing (e.g., via the interaction component 112) a rule that defines permissible interactions between the respective ones of the group of microwave equipment associated with the microwave network infrastructure being implemented for the communication network (e.g., communication network 500). At 706, the process 700 can comprise constructing (e.g., via the connection plan component 114) a wireless connection plan (e.g., connection plan 118) for the communication network, wherein the wireless connection plan (e.g., connection plan 118) comprises wireless hops between respective ones of the group of microwave equipment as determined based on the data record (e.g., data record 116) and the rule. At 708, the process 700 can comprise assigning (e.g., via the connection plan component 114) respective wireless paths to respective ones of the wireless hops of the wireless connection plan (e.g., connection plan 118) based on the rule.

Figure 8:
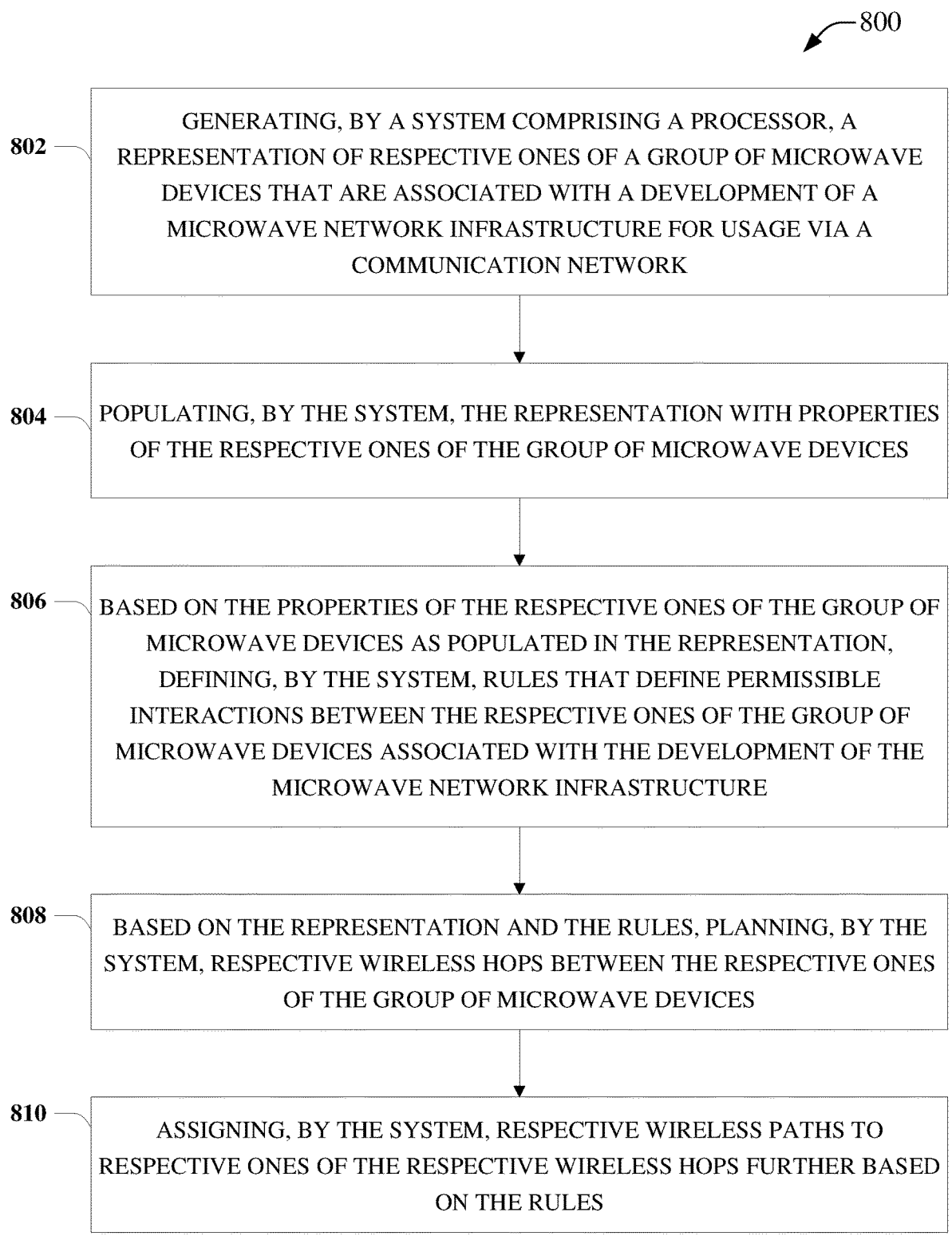
FIG. 8 is a block flow diagram for a process associated with microwave design in accordance with one or more embodiments described herein.

FIG. 8 illustrates a block flow diagram for a process 800 associated with microwave design in accordance with one or more embodiments described herein. At 802, the process 800 can comprise generating, by a system comprising a processor (e.g., via the record component 110), a representation (e.g., data record 116) of respective ones of a group of microwave devices that are associated with a development of a microwave network infrastructure for usage via a communication network (e.g., communication network 500). At 804, the process 800 can comprise populating, by the system (e.g., via the record component 110), the representation (e.g., data record 116) with properties of the respective ones of the group of microwave devices. At 806, the process 800 can comprise, based on the properties of the respective ones of the group of microwave devices as populated in the representation, defining, by the system (e.g., via the interaction component 112), rules that define permissible interactions between the respective ones of the group of microwave devices associated with the development of the microwave network infrastructure. At 808, the process 800 can comprise, based on the representation and the rules, planning, by the system (e.g., via the connection plan component 114), respective wireless hops between the respective ones of the group of microwave devices. At 810, the process 800 can comprise assigning, by the system (e.g., via the connection plan component 114), respective wireless paths to respective ones of the respective wireless hops further based on the rules.

Figure 9:
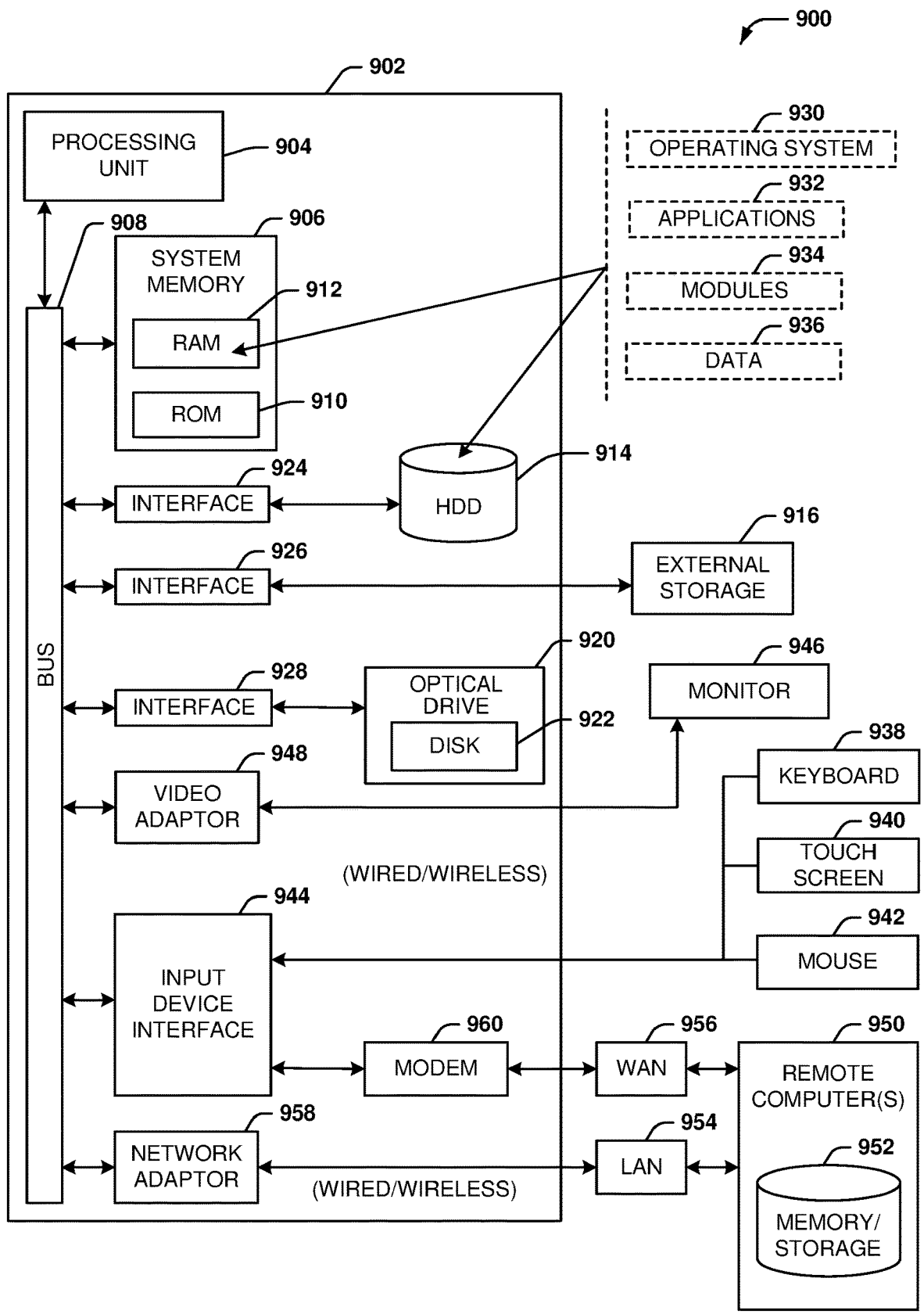
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
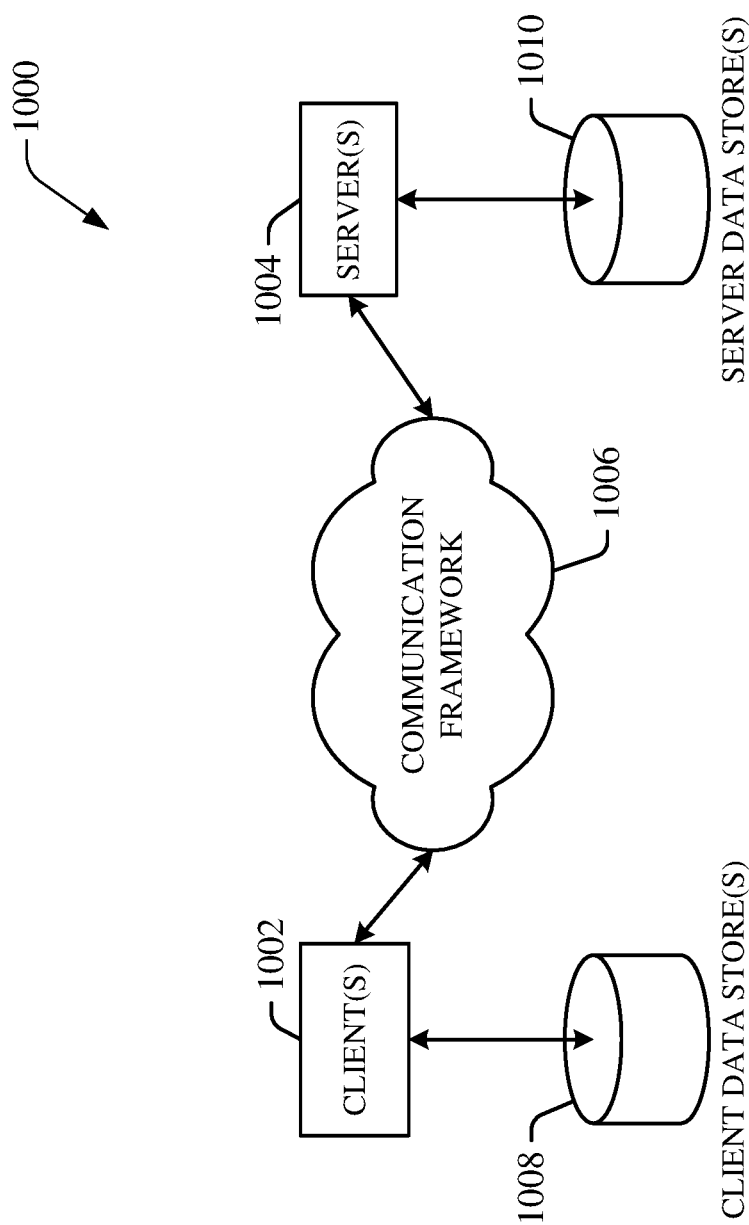
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
generating a data record, wherein the data record identifies respective ones of a group of microwave equipment that have been assigned for a development of microwave network infrastructure to be applied to a communication network, and wherein the data record further specifies properties of the respective ones of the group of microwave equipment;
based on the properties of the respective ones of the group of microwave equipment as specified by the data record, establishing a rule that defines permissible interactions between the respective ones of the group of microwave equipment associated with the development of the microwave network infrastructure;
building a wireless connection plan associated with the communication network, wherein the wireless connection plan comprises wireless hops between respective ones of the group of microwave equipment as determined based on the data record and the rule, and wherein the building comprises constraining the wireless hops based on microwave channels; and
associating respective wireless paths with respective ones of the wireless hops of the wireless connection plan further based on the rule.

2. The system of claim 1, wherein microwave equipment of the group of microwave equipment comprises a fiber optic connection to network equipment of the communication network.

3. The system of claim 1, wherein a wireless hop of the wireless hops comprises a microwave radio link aggregation.

4. The system of claim 1, wherein the permissible interactions comprise a usage of the microwave channels as permissible microwave channels.

5. The system of claim 1, wherein the permissible interactions are based on a microwave capacity, and wherein the building the wireless connection plan comprises further constraining the wireless hops based on the microwave capacity.

6. The system of claim 1, wherein the operations further comprise:
in response to generating the data record, generating a bill of materials, wherein the bill of materials comprises a listing of the respective ones of the group of microwave equipment identified by the data record.

7. The system of claim 1, wherein the operations further comprise:
in response to associating the respective wireless paths with the respective ones of the wireless hops, generating a machine-readable network plan, wherein the machine-readable network plan comprises the properties of the respective ones of the group of microwave equipment, the wireless connection plan, and the respective wireless paths.

8. The system of claim 7, wherein the operations further comprise:
integrating the machine-readable network plan with a representation of a network topology for a geographical area for which a network service is enabled by the communication network.

9. The system of claim 7, wherein the wireless hops of the wireless connection plan comprise at least one of; a backhaul connection, a fronthaul connection, or a shorthaul connection.

10. A non-transitory machine-readable medium, comprising executable instructions that, when executed by a processor, facilitate performance of operations, the operations comprising:
producing a data record, wherein the data record identifies respective ones of a group of microwave equipment that are assigned for an implementation as part of a microwave network infrastructure being implemented for a communication network, and wherein the data record further specifies properties of the respective ones of the group of microwave equipment;

based on the properties of the respective ones of the group of microwave equipment as given by the data record, establishing a rule that defines permissible interactions between the respective ones of the group of microwave equipment associated with the microwave network infrastructure being implemented for the communication network;

constructing a wireless connection plan for the communication network, wherein the wireless connection plan comprises wireless hops between respective ones of the group of microwave equipment as determined based on the data record and the rule, and wherein the constructing comprises constraining the wireless hops based on microwave channels; and assigning respective wireless paths to respective ones of the wireless hops of the wireless connection plan based on the rule.

11. The non-transitory machine-readable medium of claim 10, wherein microwave equipment of the group of microwave equipment comprises a fiber optic connection to the communication network.

12. The non-transitory machine-readable medium of claim 10, wherein a wireless hop of the wireless hops comprises a microwave radio link aggregation.

13. The non-transitory machine-readable medium of claim 10, wherein a permissible interaction of the permissible interactions comprises a usage of a microwave channel of the microwave channels as a permissible microwave channel of permissible microwave channels, and wherein the constructing the wireless connection plan comprises constraining a wireless hop of the wireless hops based on the permissible microwave channel of the permissible microwave channels.

14. The non-transitory machine-readable medium of claim 10, wherein a permissible interaction of the permissible interactions is based on a microwave capacity, and wherein the constructing the wireless connection plan comprises constraining a wireless hop of the wireless hops based on the microwave capacity.

15. A method, comprising:
generating, by a system comprising a processor, a representation of respective ones of a group of microwave devices that are associated with a development of a microwave network infrastructure for usage via a communication network;

populating, by the system, the representation with properties of the respective ones of the group of microwave devices;

based on the properties of the respective ones of the group of microwave devices as populated in the representation, defining, by the system, rules that define permissible interactions between the respective ones of the group of microwave devices associated with the development of the microwave network infrastructure;

based on the representation and the rules, planning, by the system, respective wireless hops between the respective ones of the group of microwave devices, and wherein the planning comprises constraining the respective wireless hops based on microwave channels; and assigning, by the system, respective wireless paths to respective ones of the respective wireless hops further based on the rules.

16. The method of claim 15, further comprising:
in response to the generating the representation, generating, by the system, a bill of materials, wherein the bill of materials comprises a listing of the respective ones of the group of microwave devices identified by the representation.

17. The method of claim 15, further comprising:
in response to the assigning the respective wireless paths to the respective ones of the wireless hops, generating, by the system, a machine-readable network plan, wherein the machine-readable network plan comprises the properties of the respective ones of the group of microwave devices and the respective wireless paths.

18. The method of claim 17, further comprising:
integrating, by the system, the machine-readable network plan with a representation of a network topology for a geographical area to which the communication network provides a network service.

19. The method of claim 15, wherein the wireless hops comprise at least one of: a backhaul connection, or a fronthaul connection.

20. The method of claim 15, wherein a wireless hop of the wireless hops comprises a microwave radio link aggregation.

* * * * *